Figure 1:
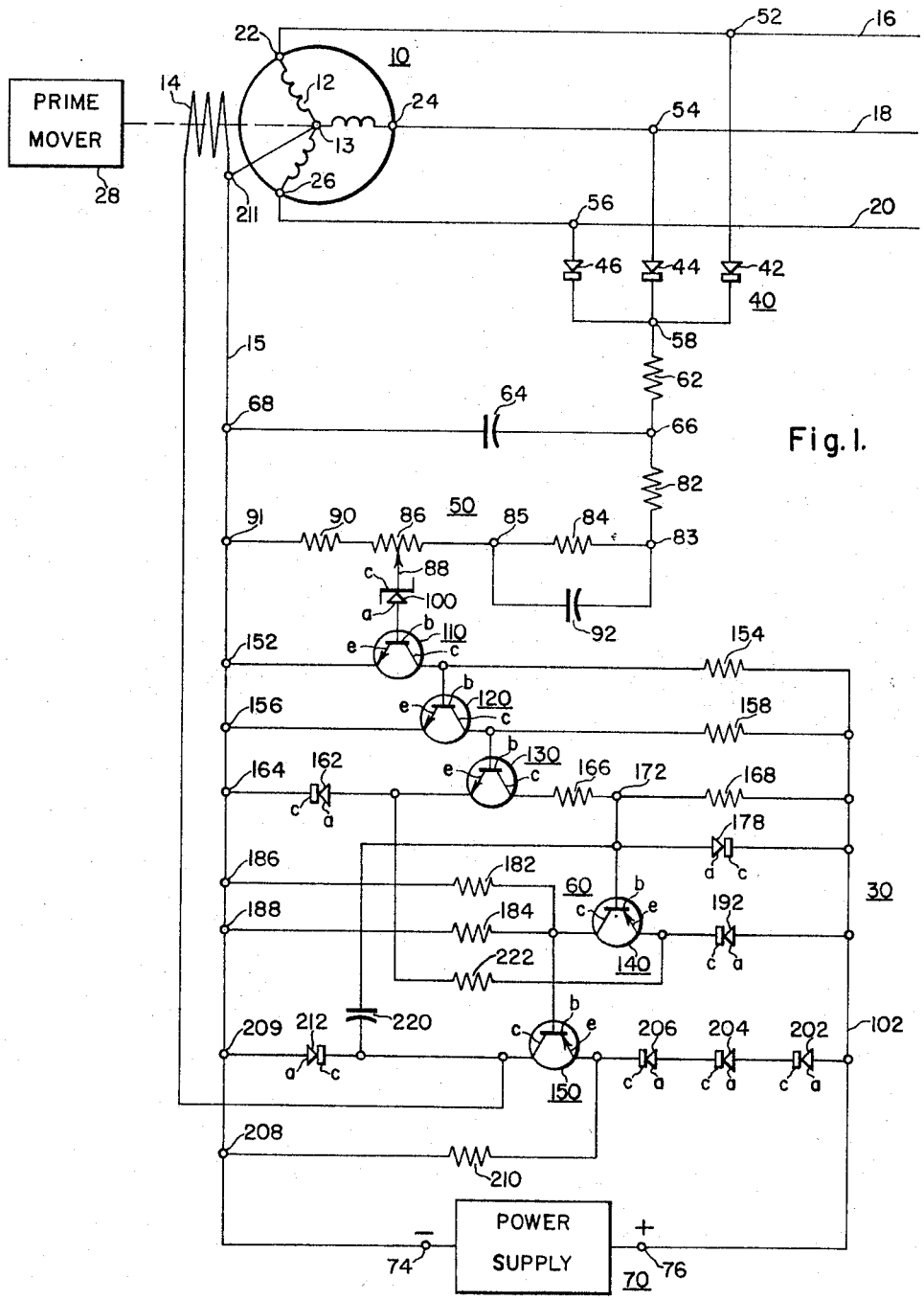

Nov. 8, 1966   J. L. ROOF ET AL   3,284,694
VOLTAGE REGULATING SYSTEM FOR AN ELECTRICAL GENERATOR
Filed April 12, 1963   2 Sheets-Sheet 1

WITNESSES
Theodore F. Wrobel
Donald R. Lackey

INVENTORS
James L. Roof
and Lynn L. Tipton
BY
F. E. Browder
ATTORNEY

United States Patent Office 3,284,694
Patented Nov. 8, 1966

3,284,694
VOLTAGE REGULATING SYSTEM FOR AN ELECTRICAL GENERATOR
James L. Roof, Fort Shawnee, and Lynn L. Tipton, American Township, Allen County, Ohio, assignors to Westinghouse Electric Corporation, Pittsburgh, Pa., a corporation of Pennsylvania
Filed Apr. 12, 1963, Ser. No. 272,682
1 Claim. (Cl. 322—28)

This invention relates in general to electrical control apparatus and more particularly to regulator systems.

Regulator systems for 400 cycle per second aircraft power applications should be very reliable and meet high limits as to quality of power. Regulating systems for 400 c.p.s. ground power applications, however, do not require aircraft type of components and construction, and a considerably lower cost system should be devised that will eliminate the higher cost components and still meet moderate limits as to quality of regulated power.

Accordingly, it is an object of this invention to provide a new and improved electrical control apparatus.

Another object of this invention is to provide a new and improved 400 c.p.s. regulator system for ground power applications.

A further object of this invention is to provide a new and improved 400 c.p.s. regulator system which uses all relatively inexpensive components.

A still further object of this invention is to provide a 400 c.p.s. regulator system for ground power applications which is substantially lower in intial cost than aircraft type 400 c.p.s. regulating systems, but still will meet moderate limits as to quality of regulated power.

Briefly, the present invention accomplishes the above cited objects by providing a new and improved regulating system that utilizes relatively inexpensive transistors, diode rectifiers, low voltage Zener type diode, moderate voltage paper capacitors and low power resistors. The disclosed invention successfully eliminates higher cost items such as transformers, chokes, high voltage Zener type diodes, high power resistors and electrolytic capacitors. More specifically, the amplifying portion of the regulating system utilizes three low-power silicon transistors and two high-power germanium transistors. The sensing, reference, and stability circuits are designed as one circuit, thus eliminating several components.

The regulator system rectifies a measure of the output voltage of the generator whose voltage is to be regulated, shapes the ripple component of the rectified voltage into a saw-tooth waveform and uses a Zener diode-transistor combination to pulse width modulate the voltage applied to the excitation field winding of the generator whose output voltage is to be regulated. The field voltage is produced in pulses having a frequency equal to the frequency of the saw-tooth waveform. The width of the pulses is controlled to produce the excitation current required to maintain the output voltage of the generator at substantially the desired value.

Other objects and advantages of the invention will become apparent as the following description proceeds and features of novelty which characterize the invention will be pointed out in particularity in the claims annexed to and forming a part of this specification.

Figure 2:
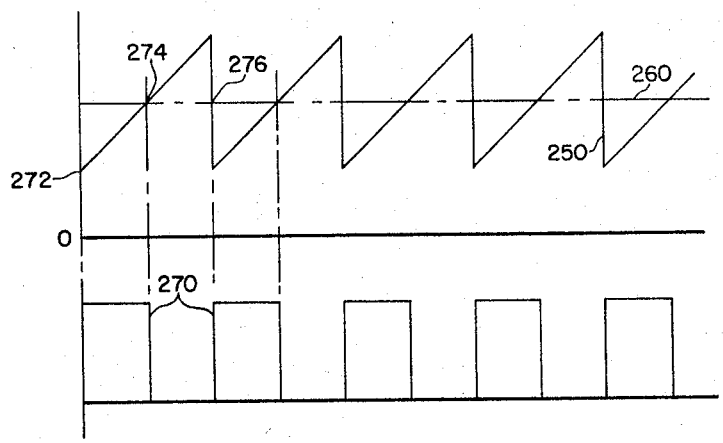
Figure 3:
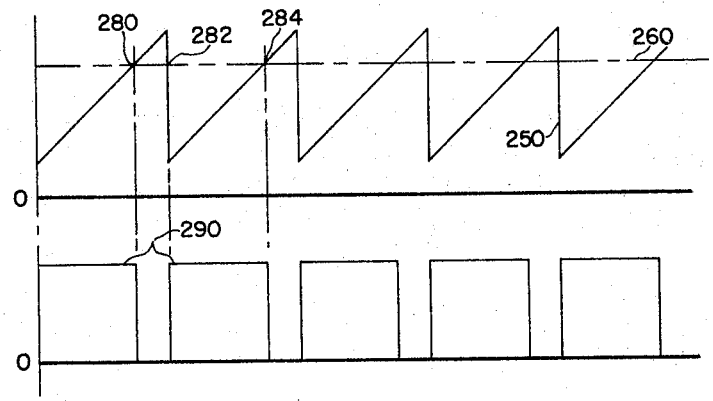
Figure 4:
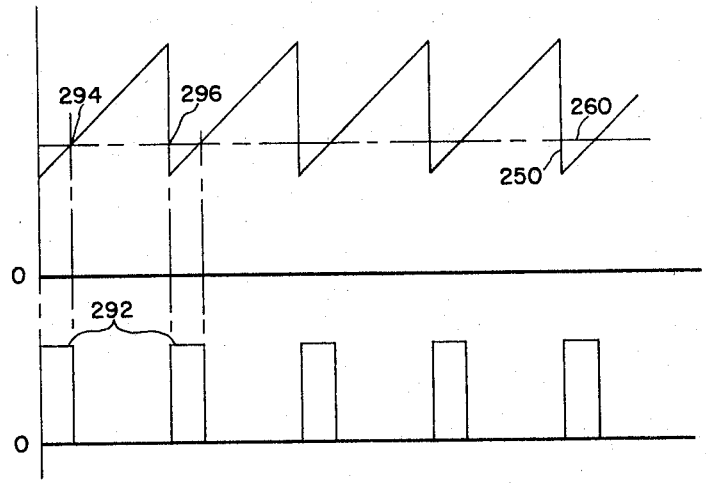

For a fuller understanding of the nature and objects of this invention, reference should be had to the following detailed description taken in connection with the accompanying drawings, in which:

FIGURE 1 is a schematic diagram of apparatus and circuits illustrating an embodiment of the invention; and FIGURES 2, 3 and 4 graphically show the pulse width modulation of field voltage for various magnitudes of generator output voltage.

Referring now to the drawings and FIGURE 1 in particular, there is illustrated a dynamoelectric machine or generator 10 having an armature 12 and excitation field winding 14. The armature 12 is disposed to supply 400 c.p.s. electrical energy to line conductors 16, 18 and 20 through output terminals 22, 24 and 26, respectively. The rotatable element of generator 10 may be connected to a prime mover 28, which may be an electric motor or any other driving means. The neutral connection 13 of armature 12 is connected to conductor 15.

In order to maintain the output of generator 10 at substantially a predetermined value, a regulator system 30 is connected between the output terminals 22, 24 and 26 of generator 10 and the excitation field winding 14 of the generator 10.

In general, the regulating system 30 comprises a rectifier circuit 40, sensing and reference circuit 50, amplifying and switching circuit 60, and power supply 70. More specifically, rectifying system 40 is responsive to the output voltage of the generator 10, and is connected to generator line conductors 16, 18 and 20 at points 52, 54 and 56, respectively. The rectifier system 40 may be comprised of semiconductor diode rectifiers 42, 44 and 46, or any other suitable type of rectifying device. The unidirectional voltage appearing at junction 58 of rectifier system 40 is proportional to the output voltage of the generator 10 and contains a ripple component impressed upon the unidirectional voltage which has a frequency equal, in this instance, to 1,200 cycles per second or three times the base frequency of the generator 10.

In order to modify the waveform of the ripple component impressed upon the unidirectional voltage supplied by a rectifier system 40 into a substantially saw-toothed shape, resistor 62 and capacitor 64 are connected from the rectifier system 40 to conductor 15. More specifically, one side of resistor 62 is connected to junction 58 of rectifier system 40, and the remaining terminal of resistor 62 is connected to capacitor 64 at junction 66. The remaining terminal of capacitor 64 is connected to conductor 15 at point 68.

The unidirectional voltage having the saw-toothed component impressed upon it is applied to sensing and reference circuit 50 which includes resistors 82, 84, 86 and 90. Resistor 82 has one terminal connected to junction 66 and the other terminal connected to resistor 84 at junction 83. The remaining terminal of resistor 84 is connected to resistor 86 at junction 85. Tne remaining terminal of resistor 86 is connected to one terminal of resistor 90, and the remaining terminal of resistor 90 is connected to conductor 15 at point 91. Resistor 86 is of the adjustable type and has a movable arm 88 connected to the reference portion of reference and sensing circuit 50.

In order to provide compensation to stablize the generator-regulator closed-loop system, a capacitor 92 is connected across resistor 84 at junctions 83 and 85. Capacitor 92, in cooperation with resistor 84 and the combination of resistors 82, 86 and 90, comprise a lead network. This lead network provides phase angle correction to the loop-gain function at the proper frequency.

Resistor 82 provides a voltage drop and serves as an isolation resistor between capacitors 64 and 92. Resistor 86, which is of the adjustable type, provides the means for setting the generator voltage to the desired magnitude. Resistor 90 may be a temperature sensitive resistor, which compensates for parametric changes in other components over the operating temperature range of the regulating system.

The sensing and reference circuit 50 also comprises the hereinbefore mentioned adjustable resistor 86 with its movable arm 88 and voltage sensitive rectifier 100, which is preferably of the type known in the art as a Zener diode. Zener diode 100 comprises an anode $a$ and a cathode *c*, and possesses a very sharp breakdown characteristic at a predetermined voltage in its normally non-conducting direction. The cathode electrode *c* of Zener diode 100 is connected to movable arm 88 of adjustable resistor 86 and the anode electrode *a* of Zener diode 100 is connected to the switching circuit 60.

The switching circuit 60 of regulating system 30 is powered by power supply 70. Power supply 70 may be any unidirectional source of electric potential such as a permanent magnet generator with rectifiers, tapped alternator windings with rectifiers, or transformer-rectifier system. Power supply 70 has output terminals 74 and 76, with negative output terminal 74 being connected to conductor 15 and hence to the neutral connection 13 of the generator 10, and the positive output terminal 76 being connected to conductor 102.

In general, switching circuit 60 is comprised of a plurality of transistors arranged to operate in switching mode. In the particular embodiment shown in FIGURE 1, five transistors are utilized, with transistors 110, 120, and 130 being relatively low power, silicon transistors of the NPN type. Transistors 140 and 150 are higher power germanium transistors of the PNP type. Each of the aforementioned transistors include a base electrode *b*, a collector electrode *c* and an emitter electrode *e*.

Broadly, transistors 110, 120, 130, 140 and 150 operate in switching mode in response to the signal received from sensing and reference circuit 50, which signal is a measure of the deviation of the output voltage of the generator 10 from the predetermined value, as determined by the setting selected on adjustable resistor 86 and the reverse breakdown voltage characteristic of Zener diode 100. Zener diode 100 is made conductive for a period of time during each cycle of the saw-tooth frequency that is impressed upon the direct current potential derived from the rectifier system 40. The length of time Zener diode 100 conducts in its reverse direction depends upon the deviation of the output voltage of generator 10 from the desired magnitude. When the voltage applied to sensing and reference circuit 50 is below the reference voltage of said circuit, there will be no signal applied to transistor 110 and transistor 150 will conduct. On the other hand, when the voltage applied to sensing and reference circuit 50 is above the reference voltage of said circuit, transistor 110 will conduct and transistor 150 will become non-conductive. Voltage regulation is accomplished by connecting transistor 150 in series circuit relation with the field winding 14 of the generator 10. In other words, transistor 150 is made conductive periodically, allowing periodic pulses of undirectional current to flow through transistor 150 and field winding 14 from the power supply 70. The width of the periodic pulses is varied in accordance with the magnitude of the output voltage of the generator 10, establishing an average excitation current in field winding 14 which maintains the output voltage of the generator 10 at substantially the predetermined or desired magnitude. The frequency of the periodic pulses is controlled by the frequency of the saw-tooth waveform, which in this instance is equal to three times the output frequency of the generator 10 or 1,200 cycles per second.

Switching circuit 60, as hereinbefore stated, is comprised of transistors 110, 120, 130, 140 and 150. Zener diode 100 has its anode electrode connected to the base electrode *b* of transistor 110 and the emitter electrode *e* of transistor 110 is connected to conductor 15 at point 152. The collector electrode of transistor 110 is connected through resistor 154 to conductor 102. Transistor 110 is connected to control the switching of transistor 120 by having the base electrode *b* of transistor 120 connected to the collector electrode *c* of transistor 110. The emitter electrode *e* of transistor 120 is connected to conductor 15 at point 156 and the collector electrode *c* of transistor 120 is connected through resistor 158 to conductor 102. Transistor 130 is connected to be responsive to transistor 120 by connecting the base electrode *b* of transistor 130 to the collector electrode *c* of transistor 120. The emitter electrode *e* of transistor 130 is connected through rectifier 162 to conductor 15 at point 164. Rectifier 162 may be a semiconductor diode having an anode electrode *a* and a cathode electrode *c*, with its cathode electrode *c* being connected to point 164 and its anode electrode *a* being connected to the emitter electrode *e* of transistor 130. The collector electrode *c* of transistor 130 is connected through resistors 166 and 168 to conductor 102, with resistor 166 having one end connected to the collector electrode *c* of transistor 130 and its remaining end connected to the junction 172 between resistors 166 and 168. The remaining terminal of resistor 168 is connected to conductor 102. Transistor 140 is connected to be responsive to transistor 130 by connecting the base electrode *b* of transistor 140 to the junction 172 between resistors 166 and 168. A rectifier 178 may be connected from the base electrode *b* of transistor 140 to conductor 102, to provide protection for the base-emitter junction of transistor 140 from voltage transients. Rectifier 178 may be a semiconductor diode having a cathode electrode *c* and an anode electrode *a*, with its cathode electrode *c* being connected to conductor 102 and its anode electrode *a* being connected to the base electrode *b* of transistor 140. The collector electrode *c* of transistor 140 is connected through parallel-connected resistors 182 and 184 to conductor 15 at points 186 and 188 respectively. The emitter electrode *e* of transistor 140 is connected through rectifier 192 to conductor 102. Rectifier 192 may be a semiconductor diode having a cathode electrode *c* and an anode electrode *a*, with the cathode electrode *c* of diode 192 being connected to the emitter electrode *e* of transistor 140 and the anode electrode *a* of diode 192 being connected to conductor 102. Resistors 154, 158, 168, 166, 182 and 184, hereinbefore described, are current limiting resistors which protect their associated transistors and cause them to operate in the proper areas.

Transistor 150 is connected to be responsive to transistor 140 by connecting the base electrode *b* of transistor 150 to the collector electrode *c* of transistor 140. The emitter electrode *e* of transistor 150 is connected through a plurality of rectifiers 202, 204 and 206 to conductor 102. Rectifiers 202, 204 and 206 may be semiconductor diodes, each having an anode electrode *a* and a cathode electrode *c*. Rectifiers 202, 204 and 206 are poled to conduct current from line 102 to the emitter electrode *e* of transistor 150, with the anode electrode *a* of rectifier 202 being connected to line 102 and the cathode electrode *c* of rectifier 206 being connected to the emitter electrode *e* of transistor 150. The emitter electrode *e* of transistor 150 is also connected to conductor 15 at point 208 through resistor 210. The collector electrode *c* of transistor 150 is connected through rectifier 212 to conductor 15 at point 209 and the collector electrode *c* of transistor 150 is also connected to excitation field winding 14 of the generator 10. Rectifier 212 may be a semiconductor diode having an anode *a* and a collector electrode *c*, with its anode electrode *a* being connected to point 209 and its cathode electrode *c* being connected to collector electrode *c* of transistor 150. The remaining terminal of the excitation field winding 14 is connected to conductor 15 at point 211, which in turn is connected to negative terminal 74 of the power supply and neutral terminal 13 of the generator 10.

In order to provide feedback voltage to the base electrode *b* of transistor 140 and assure fast switching, capacitor 220 may be connected from the collector electrode *c* of transistor 150 to the base electrode *b* of transistor 140. Semiconductor diode rectifiers 192, 202, 204, 206 and 162 and resistor 210 provide bias voltages for their associated transistors to reduce leakage and decrease switching time. Resistor 222, connected between the emitter electrode *e* of transistor 130 and the collector electrode *c* of transistor 140 is also a biasing resistor provided to reduce leakage and decrease switching time.

As hereinbefore stated the regulator system 30 operates to provide excitation current to the field winding 14 of the generator 10 by supplying periodic voltage pulses to the field winding 14. The width of the periodic voltage pulses is varied in accordance with the output voltage of the generator 10 and thus an average excitation current is established which maintains the output voltage of the generator 10 at substantially the desired magnitude. The width of the periodic field voltage pulses is determined by the portion of the time during which the transistor 150 is conducting. The portion of time during which transistor 150 is conducting, compared with the portion of time during which transistor 150 is non-conducting, determines the average value of the excitation current applied to the field winding 14 of the generator 10. The average value of the current applied to excitation field winding 14 of the generator 10 determines the output voltage across the armature 12 of the generator 10. Therefore, the output terminal voltage of the generator 10 is controlled and regulated by the average excitation current applied to the field winding 14 of the generator 10.

In the operation of the regulating system 30, a power supply 70 is provided which provides unidirectional potential for the operation of the transistors 110, 120, 130, 140 and 150 and provides the unidirectional voltage which will be periodically applied to the field winding 14 of generator 10, to obtain the average excitation current required by the field winding 14 to maintain the output voltage of generator 10 at substantially the desired magnitude. In order to obtain a signal proportional to the deviation of the output voltage of the generator 10 from a reference voltage, rectifier system 40 is connected to line conductors 16, 18 and 20 of generator 10 and produces a unidirectional voltage proportional to the output voltage of generator 10. The inherent ripple component of the rectified voltage produced by rectifier system 40 is modified by capacitor 64 to have a substantially saw-tooth waveform. This saw-tooth waveform, as will be described in greater detail hereinafter, is used to trigger the switching circuit 60 on and off at a frequency equal to the frequency of the saw-tooth component. The unidirectional voltage, complete with the saw-tooth component, appearing across capacitor 64 is applied through a series of dropping resistors and temperature compensating resistors to the sensing and reference circuit 50. Sensing and reference circuit 50 includes an adjustable resistor 86 and a Zener diode 100. The desired output voltage of the generator 10 may be controlled by adjusting the resistance setting of resistor 86. When voltage is first applied to resistor 86, and it is below the desired output voltage of the generator 10, no signal will be applied to the base electrode $b$ of transistor 110, as Zener diode 100 will effectively block the conduction of current in its reverse direction until a certain predetermined voltage is reached. When no signal or voltage is being applied to the base electrode $b$ of transistor 110, transistor 110 will be cut off or in its non-conductive state. When transistor 110 is not conducting, a positive voltage will be applied to the base electrode $b$ of transistor 120, forward biasing transistor 120 causing transistor 120 to conduct current through its collector-emitter circuit. When transistor 120 is conducting, very little voltage will be applied to the base electrode $b$ of transistor 130, with the amount of voltage being applied to said base electrode $b$ being insufficient to overcome the reverse bias applied to transistor 130 by semiconductor diode 162. Therefore, transistor 130 will be cut-off or in its non-conducting state. When transistor 130 is non-conducting, there will not be sufficient voltage applied between the base and emitter electrodes of transistor 140 to cause said transistor to conduct. The voltage difference between the base and emitter electrodes of transistor 140 will be insufficient to overcome the reverse bias applied to said transistor by semiconductor diode 192. Therefore, transistor 140 will be in its non-conductive state. When transistor 140 is not conducting, a forward biasing voltage will exist between the base and emitter electrodes of transistor 150 which will be sufficient to overcome the reverse biasing effect of semiconductor diodes 202, 204 and 206, therefore, causing transistor 150 to become saturated or conducting. Since the collector-emitter path of transistor 150 is connected in series circuit relation with the field winding 14 of the generator 10, the power supply terminals 74 and 76 will supply unidirectional voltage through transistor 150 to field excitation winding 14. With field excitation voltage being applied to field winding 14 of the generator 10, the output voltage of generator 10 applied to line conductors 16, 18 and 20 will continue to rise until the voltage applied to arm 88 of adjustable resistor 86 exceeds the reverse breakdown voltage of Zener diode 100. When the reverse breakdown voltage of Zener diode 100 is exceeded, Zener diode 100 will conduct current with a substantially constant voltage drop across said Zener diode, therefore, applying a signal to the base electrode $b$ of transistor 110. The signal applied to the base electrode $b$ of transistor 110 by Zener diode 100 forward biases the base-emitter junction of transistor 110, causing it to become saturated and conduct current through its collector-emitter path. When transistor 110 conducts, the voltage appearing between the base and emitter electrodes of transistor 120 drops to a very low value causing transistor 120 to become cut-off or non-conducting. When transistor 120 becomes non-conducting, a forward biasing voltage will appear between the base and emitter electrodes of transistor 130, causing transistor 130 to become conducting. When transistor 130 becomes conducting, a voltage difference will appear between the base and emitter electrodes of transistor 140 overcoming the reverse bias applied to transistor 140 by semiconductor diode 192 and causing transistor 140 to conduct current through its collector-emitter path. When transistor 140 becomes conducting, the voltage applied to the base-emitter junction of transistor 150 will become insufficient to overcome the reverse bias applied to transistor 150 by semiconductor diodes 202, 204 and 206, causing transistor 150 to become cut-off or non-conducting. When transistor 150 becomes non-conducting, it effectively disconnects the power supply 70 from the field excitation winding 14, therefore causing the output voltage of generator 10 to start to decrease. When the output voltage of the generator 10 falls below the reference voltage of circuit 50, the transistor 110 will no longer be conductive, causing transistor 150 to again conduct current and allow the output voltage of the generator 10 to again increase. This process repeats itself during each cycle of the saw-tooth waveform impressed upon the unidirectional voltage applied to the sensing and reference circuit 50. Since the field voltage applied to field excitation winding 14 of the generator 10 is switched at a very high rate, in this instance 1,200 cycles per second, the output voltage produced by generator 10 is very smooth, with fluctuations due to switching being eliminated. The very rapid switching rate prevents wide instantaneous voltage variations as the series connected transistor switches from one state to the other. Also, the operation of the transistors in switching mode, or from the completely cut-off to the completely conducting state, provides the most efficient operation for the regulator and reduces the power consumption of the regulator to an absolute minimum.

It should be noted that the reference, sensing, and stability functions are provided in one circuit, therefore eliminating many components.

More specifically, the functions of reference, sensing and stability are provided by the circuit 50 connected from point 58 of rectifier circuit 40 to points 68 and 91 on conductor 15. Capacitor 64, connected from point 66 to point 68, shapes the unidirectional voltage provided by rectifier circuit 40 into a substantially saw-tooth shape which may be used for sensing purposes, since the unidirectional voltage output of rectifier circuit 40 is proportional to the alternating voltage output of generator 10. The resistors 62, 82, 84 and 86, connected in series circuit relation from point 58 to resistor 90, provide the proper range of sensing voltage for comparison with the reference voltage, thus eliminating a voltage step-down transformer. Resistor 86, being adjustable, provides means for selecting the desired output voltage of the generator 10. The reference means, or Zener diode 100, is connected to the movable arm 88 of adjustable resistor 86, and provides error signals or pulses to the switching circuits 60, with said pulses having a width proportional to the deviation of the sensing voltage from the reference voltage. Stability is provided by resistor 84 and capacitor 92, as hereinbefore described. Resistor 90 is a temperature compensating resistor, changing its resistance to compensate for resistance changes of resistors 62, 82, 84 and 86, and also to compensate for variations in the junction characteristics of Zener diode 100 and the base-to-emitter junction characteristic of transistor 110 over their operating temperature range. The characteristics of resistor 90 are selected so that the output voltage of generator 10 is substantially unaffected by temperature changes of the hereinbefore mentioned components.

To enable transistor 150 to switch at the high switching rates involved, capacitor 220 shortens the turn-on and turn-off time of transistor 150 by connecting capacitor 220 from the collector electrode *c* of transistor 150 to the base electrode *b* of transistor 140. Further, fast switching is facilitated by providing reverse bias for the switching transistors in the form of semiconductor diodes 192, 202, 204, 206 and 162 and resistors 222 and 210.

Rectifier 212 is provided as a low resistance discharge path for the current produced by the collapsing field voltage of the excitation field winding 14 during periods in which transistor 150 is non-conducting. The semiconductor diode 212 prevents any excessive voltage across transistor 150 due to the voltage produced by the collapsing field of said excitation field winding. Semiconductor diode 212 conducts current each time transistor 150 is cut-off.

In summary, Zener diode 100, in conjunction with adjustable resistor 86, will produce a voltage pulse when the saw-tooth waveform imposed upon the direct current voltage output of generator 10 exceeds a certain predetermined voltage. The width of this pulse will vary in accordance with the devitation of the output voltage of generator 10 from the reference voltage. The reference voltage is determined by the Zener or breakdown voltage of Zener diode 100 as modified by the voltage adjusting rheostat 86. The width of the pulse will be greater or less depending upon whether the output voltage of generator 10 is above or below the desired value, as determined by the sensing and reference circuit 50. The saw-tooth component contained in the output of rectifier 40 exceeds the Zener voltage during each saw-tooth cycle and triggers the operation or conduction of Zener diode 100. Pulses are, therefore, created at a rate equal to the frequency of the saw-tooth frequency and the voltage pulses are impressed upon switching circuit 60. When no pulse signal is being received by transistor 110, transistor 150 is at saturation and thus, current is flowing through the field excitation winding 14 of the generator 10. When a pulse is received by transistor 110, transistor 150 is switched to its non-conducting state. Therefore, during the period a pulse is being applied to transistor 110, there is no current flowing through transistor 150. By varying the width of the pulses, the average excitation current required to maintain the desired voltage output of generator 10 may be obtained, and accurate fast control of the direct current output voltage of the generator 10 is acquired.

Once the magnitude of voltage to be maintained is selected by the adjustable resistor 86, this voltage is maintained at the predetermined value as the load conditions, or other factors affecting the voltage output of generator 10 are changed, as will be hereinafter explained.

FIGURES 2, 3 and 4 illustrate the saw-tooth component of the unidirectional voltage enlarged to allow a better understanding of the graphs. FIGURES 2, 3 and 4 also illustrate the pulse modulation of the excitation field voltage for the operation of the generator 10 when the output voltage of said generator is at the regulated value, below the regulated value, and above the regulated value, respectively. In particular, FIGURES 2, 3 and 4 indicate the field voltage pulses that are applied to the field excitation winding 14 of the generator 10 for each of the above-described conditions. The saw-tooth component of the unidirectional voltage is shown in FIGURES 2, 3 and 4 as reference numeral 250. The dotted line 260 represents the predetermined voltage which is to be maintained by the regulating system 30, as determined by the combination of the Zener diode 100, the adjustable resistor 86, the temperature compensating resistor 90, the stability circuit comprising resistor 84 and capacitor 92, and resistor 82.

FIGURE 2 illustrates the pulse modulation of the excitation field voltage when the output voltage of the generator 10 is at the desired regulated value. In other words, the field voltage pulses 270 have a width substantially equal to the width of the period when no pulses are being generated. More specifically, during the portion the saw-tooth component 250 is below the desired voltage line 260, such as from point 272 to 274, Zener diode 100 will block the transfer of a signal to transistor 110, causing transistor 110 to be cut-off or in its non-conductive state and transistor 150 will be saturated as hereinbefore described. Therefore, field current is allowed to flow during this period, as evidenced by field voltage pulse 270. As the saw-tooth component increases in magnitude and exceeds the predetermined voltage line 260, as shown from points 274 to 276 in FIGURE 2, Zener diode 100 applies a pulse to the base electrode of transistor 110 causing transistor 110 to become saturated and transistor 150 to become cut-off or non-conductive. During this period while transistor 150 is non-conductive, there is no voltage applied to the excitation field winding 14 of the generator 10.

Now, assume that an increased load has been applied to the generator 10, or some other condition has occurred to cause the output voltage of generator 10 to decrease. FIGURE 3 illustrates this effect upon the field voltage pulse width. The Zener diode 100 will apply a control pulse to the base electrode *b* of transistor 110 only during the relatively short period that its breakdown voltage is exceeded, as evidenced by points 280 to 282. From points 282 to 284 the Zener voltage of Zener diode 100 is not exceeded, and no pulse will be applied to transistor 110 during this period, with the result that transistor 150 will be at saturation, thus allowing field voltage to be applied to excitation field winding 14 of the generator 10. As a result, field voltage occurs in wider pulses as evidenced by the pulses 290 in FIGURE 3. These wider pulses establish an increase in the average excitation current allowed to flow through field winding 14 and the voltage output of generator 10 rises to the desired regulated value as shown in FIGURE 2. Therefore, in order to maintain a predetermined regulated voltage, the pulses of excitation voltage are modulated to produce an average excitation current in the field winding 14 of the generator 10 that will produce the value of direct current output voltage desired.

Now, assume the load has been removed from the generator 10, or some other condition occurred to cause the output voltage of the generator 10 to increase. FIGURE 4 illustrates this effect upon the field voltage applied to the field winding 14 of the generator 10. The pulses of exciter field voltage 292 are narrowed to produce a lower average field current, because transistor 110 is conducting a greater portion of the time due to the wider pulses produced by Zener diode 100. In other words, the breakdown voltage of Zener diode 100 is exceeded from point 294 to 296, causing transistor 110 to become saturated and hence turning the exciter field control element or transistor 150 off. This consequent decrease in average field current will cause the voltage output of the generator 10 to decrease back to the desired regulated value.

In summary, when the output voltage of the generator 10 exceeds the regulated value, as illustrated by dotted line 260 in FIGURES 2, 3, and 4, the voltage pulses applied to the excitation field winding 14 of the exciter 10 narrows, causing the average field current to decrease in value, and, therefore, causing the output voltage of the generator 10 to decline to the proper value. When the output voltage of the generator 10 is below the regulated value, the voltage pulse applied to the excitation field winding 14 of the generator 10 widens, causing the average field current to increase in value and causing the output voltage of the generator 10 to rise to the proper value.

It will, therefore, be apparent that there has been disclosed a regulator system which has a minimum of components and which uses all relatively inexpensive components and yet will meet moderate limits as to quality of regulated voltage. The regulating system disclosed utilizes relatively inexpensive silicon and germanium transistors, diode rectifiers, low voltage Zener type diodes, moderate voltage paper capacitors and low-power resistors. The design disclosed has successfully eliminated higher cost items such as transformers, chokes, high voltage Zener diodes, high power resistors and electrolytic capacitors. Further, by combining several functions into one circuit, many components have been eliminated.

The regulating system disclosed also has many other advantages. For example, the regulating system will produce a very smooth voltage output with instantaneous variations eliminated, because of the very rapid switching rate. Also, there is very little power dissipated in the regulator system, because the transistors are operated in switching mode instead of a point intermediate cut-off and saturation. Further, adjusting the excitation of a generator by pulse width modulation, substantially eliminates the problem of drift from the operating point. In addition, starting of the generator is accomplished automatically without need for a separate starting control signal since the regulator system 30 is arranged to produce excitation current without the application of input control signals of a predetermined magnitude from the associated generator.

Although the invention has been described relative to 400 c.p.s. systems, it is not intended to be so limited. It is obvious that the invention disclosed herein is equally applicable to other frequencies, such as 60 c.p.s. systems.

Since numerous changes may be made in the above-described apparatus and different embodiments of the invention may be made without departing from the spirit thereof, it is intended that all matter contained in the foregoing description or shown in the accompanying drawing shall be interpreted as illustrative, and not in a limited sense.

We claim as our invention:

A regulating system for maintaining at substantially a predetermined value the output voltage of an alternating current generator having an excitation field winding, neutral terminal and output terminals comprising rectifier means connected in circuit relation with the output terminals of said alternating current generator, said rectifier means obtaining a unidirectional voltage proportional to the output voltage of said alternating current generator, said unidirectional voltage having a ripple component, first, second, third and fourth resistors serially connected between said rectifier means and said neutral terminal, respectively, first capacitance means connected from the junction between said first and second resistors to said neutral terminal, providing a wave shaping circuit which shapes the ripple component of said unidirectional voltage into a substantially saw-tooth shape, said fourth resistor having predetermined temperature characteristics which thermally stabilizes the regulating system over a predetermined operating temperature range, second capacitance means connected across said second resistor, said second capacitance means and said second resistor providing phase angle correction at the output frequency of said alternating current generator, said third resistor being adjustable and having a movable contact arm, Zener diode means connected to the movable contact arm of said third resistor, said Zener diode means providing control signals at the frequency of said saw-tooth component when the unidirectional voltage and saw-tooth component exceed a predetermined magnitude, said control signals having a width proportional to the deviation of the output voltage of said alternating current generator from the reference voltage determined by said third resistor and said Zener diode, first transistor means having base, collector and emitter electrodes connected in circuit relation with said Zener diode, the control signals of said Zener diode causing periodic pulses of current to flow between the collector and emitter electrodes of said first transistor means producing periodic output pulses, the width of said output pulses varying with said control signals, a plurality of switching transistors connected in circuit relation with said first transistor and amplifying the output pulses of said first transistor, the final switching transistor of said plurality being arranged to be conducting in the absence of an output pulse from said first transistor, and non-conducting while said first transistor is producing an output pulse, power supply means producing a substantially constant direct current voltage, said last switching transistor of said plurality, said power supply means and said excitation field winding being connected in series circuit relation, said last switching transistor controlling the current flowing in said field excitation winding.

UNITED STATES PATENTS

References Cited by the Examiner

| | | | |
|---|---|---|---|
| 3,044,006 | 7/1962 | Barnard | 322—28 |
| 3,136,940 | 6/1964 | Carlson | 322—73 |
| 3,168,693 | 2/1965 | Eckenfelder | 322—28 |
| 3,173,077 | 3/1965 | Kirk et al. | 322—73 |
| 3,211,988 | 10/1965 | Henderson et al. | 322—28 |

MILTON O. HIRSHFIELD, *Primary Examiner.*

J. J. SWARTZ, *Assistant Examiner.*